United States Patent [19]
Wren

[11] Patent Number: 5,014,340
[45] Date of Patent: May 7, 1991

[54] EMERGENCY LOCATING TRANSMITTER

[75] Inventor: Paul E. Wren, Severna Park, Md.

[73] Assignee: The United States of America as represented by the Administrator of the National Aeronautics and Space Administration, Washington, D.C.

[21] Appl. No.: 242,254

[22] Filed: Sep. 9, 1988

Related U.S. Application Data

[62] Division of Ser. No. 921,576, Oct. 21, 1986, Pat. No. 4,777,658.

[51] Int. Cl.$^5$ .............................................. H04K 3/00
[52] U.S. Cl. ........................................ 455/1; 455/99; 455/102
[58] Field of Search ................... 455/1, 89, 101, 102, 455/93, 99, 124, 125, 102, 38; 340/902, 905

[56] References Cited

U.S. PATENT DOCUMENTS

| | | | |
|---|---|---|---|
| 3,949,300 | 4/1976 | Sadler | 455/102 |
| 4,216,545 | 8/1980 | Flickshu et al. | 455/99 |
| 4,228,419 | 10/1980 | Anderson | 455/99 |
| 4,238,778 | 12/1980 | Asumi | 455/99 |
| 4,296,496 | 10/1981 | Sadler | 455/102 |
| 4,394,777 | 7/1983 | Wren | 455/38 |
| 4,485,358 | 11/1984 | Andren et al. | 455/102 |
| 4,584,708 | 4/1986 | Eilers et al. | 455/102 |
| 4,612,667 | 9/1986 | Hansen | 455/103 |
| 4,764,978 | 8/1988 | Argo et al. | 455/99 |

*Primary Examiner*—Curtis Kuntz
*Attorney, Agent, or Firm*—R. Dennis Marchant; Harold W. Adams; Ronald F. Sandler

[57] ABSTRACT

A transmitter generates three signals for sequential transmission. These signals are an unmodulated r.f. carrier, an r.f. carrier amplitude modulated by a first audio frequency waveform and an r.f. carrier amplitude modulated by a second audio frequency waveform which is distinguishable from the first and which may be employed as a means for identifying a particular transmitter. The composite, sequentially transmitted signal may be varied in terms of the individual signal transmission sequence, the duration of the individual signals, overall composite signal repetition rate and the frequency of the second audio waveform. Various combinations of signal variations may be employed to transmit different information.

10 Claims, 3 Drawing Sheets

EMERGENCY LOCATING TRANSMITTER

ORIGIN OF THE INVENTION

The invention described herein was made by an employee of the United States Government, and may be manufactured and used by or for the Government for governmental purposes without the payment of any royalties thereon or therefor.

This is a division of application Ser. No. 921,576, filed Oct. 21, 1986, now U.S. Pat. No. 4,777,658.

TECHNICAL FIELD

This invention relates to telecommunications systems, and more particularly to an emergency locating transmitter and receiver system.

BACKGROUND OF THE INVENTION

Emergency locating transmitters (ELTs) are required by federal law on all aircraft travelling more than twenty-five miles from an airport, and emergency position indicating radio beacons (EPIRBs), are required on certain classes of marine vessels. ELTs and EPIRBs are essentially the same device. They differ only in the manner in which they are activated. ELTs are activated by gravitational forces (impact) while EPIRBs are activated by water contact. Both, however, may be manually activated.

Prior art ELTs and EPIRBs transmit a distress waveform on 121.5 MHz and 243 MHz to alert emergency frequency monitors that a distress incident has occurred. The distress waveform transmitted by these devices consists of an amplitude modulated carrier signal in which the modulating signal is an audio frequency sweeping downward over a range of not less than 700 Hz, within the range of 1,600 Hz to 300 Hz, and at a sweep rate varying between 2 Hz and 4 Hz. These characteristics are required by federal law, so that the transmitted distress waveform, which can be demodulated by a receiver to a siren-like sound, may easily be recognized by individuals monitoring on 121.5 MHz and 243 MHz, who can then alert search and rescue (SAR) personnel to search for the location of the source of the distress transmission and initiate rescue operations. The distress waveform, however, does not contain information other than that an ELT or an EPIRB is transmitting it. Accordingly, SAR personnel receive no advance information on whether they are searching for an airplane, marine vessel, camper, hiker, or skier. This uncertainty contributes to the inefficient use of SAR personnel and in poor coordination among rescue operations.

The siren-like distress waveform has been designed to be primarily detected by a radio operator. However, a relatively strong signal level of at least 30 db-Hz is required before a radio operator can distinguish the siren-like sound from the background noise. This is because the frequency spectrum of some distress waveforms closely approximates the frequency spectrum of the background noise, and accordingly the siren-like sound will sound like noise until the threshold level of 30 db-Hz is reached. The close approximation of the frequency spectrum of the distress waveform to the frequency spectrum of the background noise also makes it difficult to electronically distinguish the distress waveform from the background noise.

SUMMARY OF THE INVENTION

Accordingly, it is an object of this invention to provide a transmitter which can transmit a signal having four variable parameters, where each different set of parameters corresponds to a different item of information.

Another object of the invention is to provide a transmitter for providing transmitted signals which are optimum for receiver detection.

According to the invention, the foregoing and other objects are attained by providing a transmitter generates three signals which in turn, can selectively be applied to a transmitter antenna. These signals are an unmodulated radio frequency carrier signal, a radio frequency carrier signal modulated by a series of rectangular, audio frequency pulses having a constant duty cycle whose pulse repetition rate is controllable to cyclically vary, in frequency, between a set of limits, and a radio frequency carrier signal modulated by a second audio frequency waveform which is distinguishable from the series of rectangular pulses.

The receiver for receiving signals from the transmitter includes a superheterodyne front end for converting radio frequency signals intercepted by a receiver antenna to an intermediate frequency signal. The intermediate frequency signal is applied to a phase locked loop which locks onto an unmodulated portion of the intermediate frequency signal for its duration. The receiver measures the durations of the phase locked loop being locked, and unlocked immediately after being locked, and compares these measurements to pairs of stored values to detect a match. If a match is detected, the receiver indicates the match.

DETAILED DESCRIPTION

Figure 1:
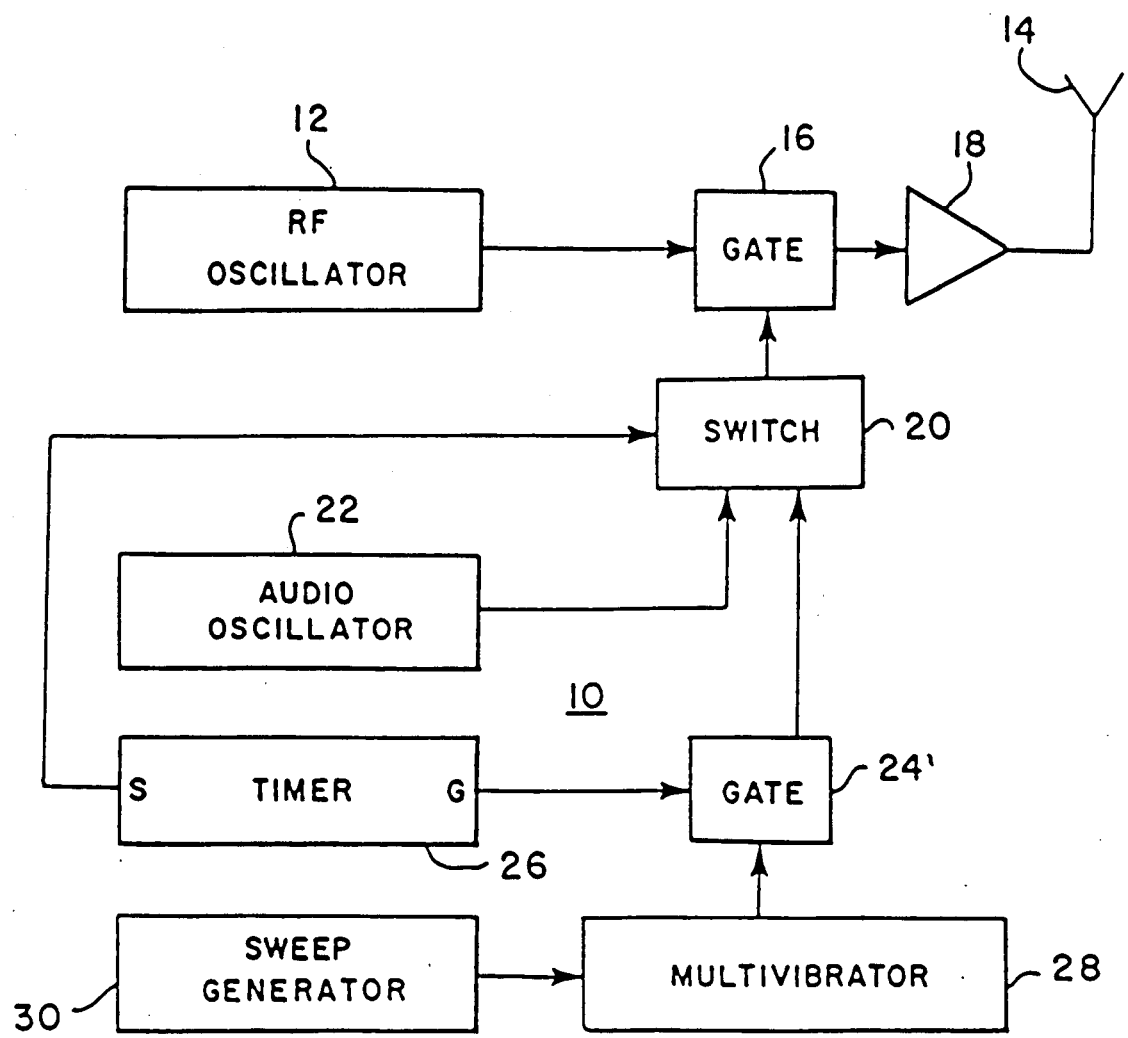
FIG. 1 is a block diagram of an ELT or EPIRB according to this invention.

Referring now to the drawings wherein like references designate identical or corresponding parts throughout the several views, and more particularly to FIG. 1 wherein the emergency locating transmitter (ELT) or the emergency position indicating radio beacon (EPIRB) of the overall system is identified by reference 10. The transmitter 10 includes a conventional radio frequency oscillator 12 which generates the 121.5 MHz sinusoidal carrier signal assigned by federal regulation. The output of oscillator 12 is applied to a transmitter antenna 14 through a gate 16 and a conventional radio frequency amplifier 18. The amplifier 18 is nonlinear and provides a frequency doubled output signal of 243 MHz as well as an amplified output 121.5 MHz signal. Gate 16 is a conventional, controllable signal gating device that passes or blocks the passage of the carrier signal generated by oscillator 12. Gate 16 is normally open to allow passage of the carrier signal. Gate 16 is controlled by a conventional controllable switch 20. The output from switch 20 is composed of either one of two signals. A conventional audio oscillator 22 provides one signal, and the output of a second gate 24 provides the other signal. Gates 16 and 24 are identical.

Normally, switch 20 feeds the output of gate 24 to gate 16. A conventional timer 26 having two outputs, S and G, controls both switch 20 and gate 24. A periodic, rectangular pulse at the S output of timer 26 will actuate switch 20 to feed the output of the audio oscillator 22 to gate 16 for the duration of the rectangular pulse. A periodic, rectangular pulse at the G output of timer 26 will cause gate 24 to be blocked for the duration of the rectangular pulse. The durations of each of the two rectangular pulses are independent of each other. The pulse repetition rate and the duration of each of the rectangular pulses provided by timer 26 determines the duration and sequence of each of the different types of signals that the transmitter 10 is capable of generating, the nature of which will be explained hereinafter.

A conventional, free-running multivibrator 28 generates an output signal which is fed to gate 24. The output of multivibrator 28 is a series of rectangular pulses whose pulse repetition rate can vary within limits and, preferably, has a constant duty cycle. The pulse repetition rate of multivibrator 28 varies between the federally assigned limits of 1600 Hz and 300 Hz, and is controllable within these limits by a control signal applied thereto by a conventional sweep generator 30. The control signal is a ramp-shaped waveform having a negative slope and a frequency ranging between 2 Hz and 4 Hz. As the ramp sweeps downward, its voltage decreases. The pulse repetition rate of multivibrator 28 varies directly with the voltage level of the range. Thus, the output of multivibrator 28 is a series of constant duty cycle rectangular pulses cyclically varying downward in repetition rate within a frequency band of at least 700 Hz between the border frequencies of 1,600 Hz and 300 Hz at a rate of 2 Hz to 4 Hz. Alternatively, the control signal may be a ramp-shaped waveform having a positive slope and a frequency varying between 2 Hz and 4 Hz. Here, the pulse repetition rate of multivibrator 28 varies indirectly with the voltage level of the ramp.

The output of free running multivibrator 28 is fed by gate 24 to switch 20 except during the period when the G output of timer 26 is causing gate 24 to block the passage of the multivibrator output. Switch 20, in turn, feeds the output of gate 24 to gate 16 except during the period when the S output of timer 26 is causing switch 20 to feed the output of audio oscillator 22 to gate 16. During the period that the output of gate 24 is being fed through switch 20 to gate 16, gate 16 is caused to close every time a pulse is generated by multivibrator 28, thereby preventing the output of oscillator 12 from being passed through gate 16 to amplifier 18 for the duration of each such pulse. The effect of the output of oscillator 12 being blocked is that the carrier signal generated by oscillator 12 is 100% amplitude modulated by the output of free running multivibrator 28. Thus, the signal applied to antenna 14 during the period when multivibrator 28 100% amplitude modulates the carrier signal is a constant amplitude carrier which is periodically interrupted at a decreasing rate. This periodically interrupted constant amplitude carrier demodulates to a siren-like sound in an amplitude modulation receiver, as will be explained hereinafter. The periodically interrupted constant amplitude carrier is defined herein as the distress waveform.

During the period that a rectangular pulse is being generated at the S output of timer 26, the output of audio oscillator 22 is fed through switch 20 to gate 16. The output of audio oscillator 22 is a fixed audio signal or tone, such as 200 Hz. However, the output of audio oscillator 22 may be any audio frequency. In response to the output of audio oscillator 22, gate 16 will open and close as a function of the frequency of the audio signal to thereby 100% amplitude modulate the carrier signal generated by RF oscillator 12 at the frequency of the audio signal.

During the period that both the output of multivibrator 28 and of audio oscillator 22 are blocked, gate 16 remains open. This allows the output of oscillator 12 to be applied to antenna 14 through gate 16 and amplifier 18 without interruption. Thus, only the unmodulated carrier signal is being transmitted by transmitter circuit 10 during this period.

Figure 2A:
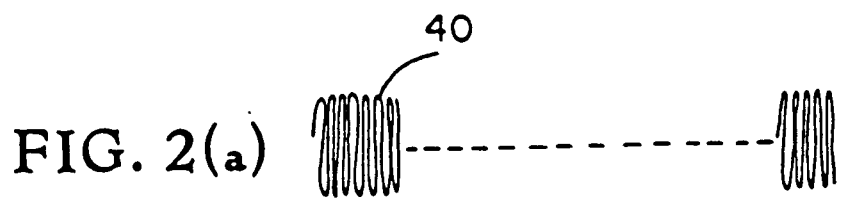
FIG. 2(a)–2(i) are waveforms illustrating the operation of the ELT or EPIRB of FIG. 1.
Figure 2B:
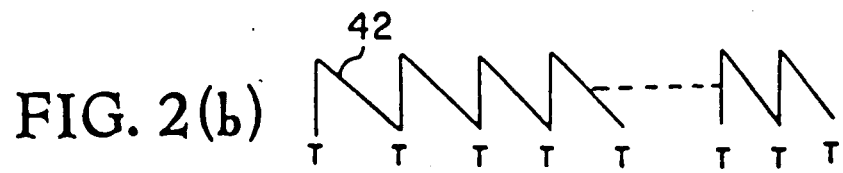
Figure 2C:
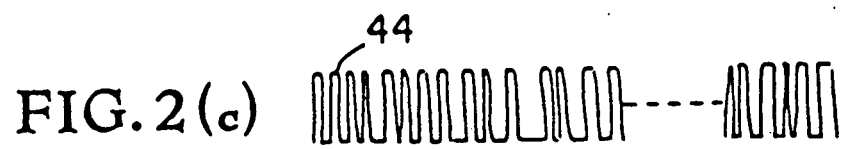
Figure 2D:
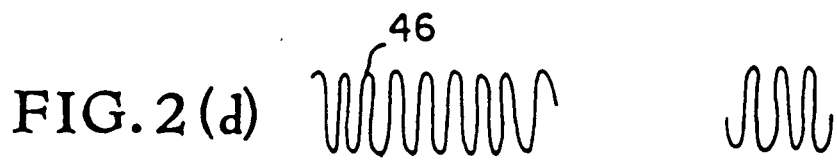
Figure 2E:
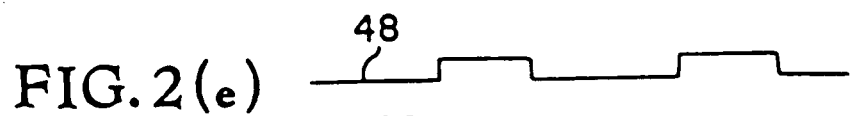
Figure 2F:
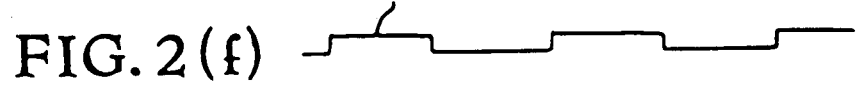
Figure 2G:
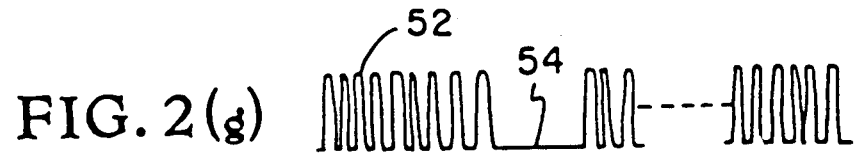

Typical waveforms occurring in the operation of transmitter circuit 10 are illustrated in FIGS. 2(a)-2(i). Waveform 40 in FIG. 2(a) represents the constant, high frequency, sinusoidal carrier frequency generated by RF oscillator 12. The frequency of waveform 40 is illustrated as being of a much lower frequency than it is in practice and has a time base different from that in FIGS. 2(b)-2(g). Waveform 42 in FIG. 2(b) represents the ramp-shaped signal generated by sweep generator 30. Although waveform 42 is illustrated as having only a single period T, the period may be fixed at a value between 0.5 seconds and 0.25 seconds. This corresponds with the fact that the frequency of sweep generator 30 may lie between 2 Hz and 4 Hz, and the period is the reciprocal of the frequency. Waveform 44 illustrated in FIG. 2(c) represents the rectangular pulse shape and varying repetition rate output of free running multivibrator 28. Waveform 46, illustrated in FIG. 2(d), represents the constant frequency sinusoidal output of audio oscillator 22. Waveforms 48 and 50 illustrated in FIGS. 2(e) and 2(f), respectively, represent the S and G outputs of timer 26. Waveform 52 in FIG. 2(g) shows the shaped pulse output of gate 24, where reference 54 indicates the interval in which the output multivibrator 28 is blocked.

As previously explained, three different signals generated in transmitter 10 can be applied to antenna 14. Depending on the pulse repetition rate and the duration of each of the periodic, rectangular pulses generated by timer 26, and the frequency of the audio oscillator 22, the signal transmitted by antenna 14 will have four different parameters. These parameters are which one or more of the three signals generated by transmitter 10 will be applied to antenna 14, the sequence in which the signals will be applied to antenna 14, the duration of each of the applied signals, and the frequency of the audio signal. The four parameter signal transmitted by antenna 14 will hereinafter be referred to as the distress transmission.

Figure 2H:
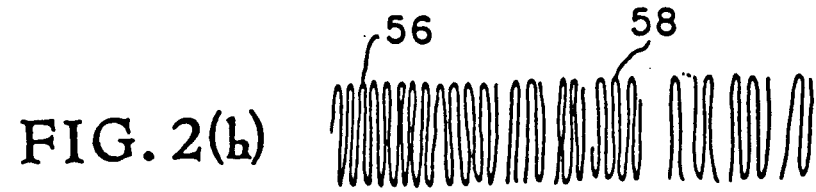
Figure 2I:
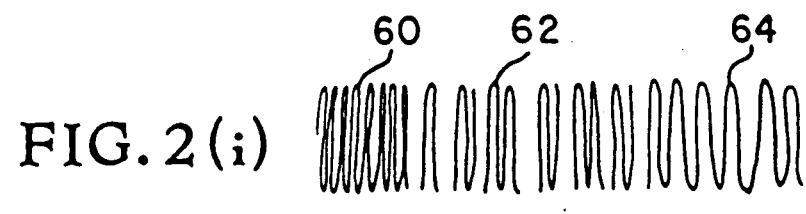

Because the four parameters of the distress transmission may be varied, particular combinations of parameters can represent a different item of information on the distress event. For example, a distress transmission having two seconds of unmodulated carrier followed by eight seconds of the distress waveform may indicate that an aircraft is the source of the distress transmission, while one second of unmodulated carrier followed by five seconds of the distress waveform, followed, in turn, by one second of the carrier signal modulated by a 100 Hz audio tone may indicate that a marine vessel is the source of the distress transmission, and that the marine vessel is an oil tanker. The waveforms for these two distress transmissions are respectively illustrated in FIGS. 2(h) and 2(i). In FIG. 2(h), waveform segment 56 identifies the unmodulated carrier portion of the distress transmission, and waveform segment 58 identifies the distress waveform. Waveform 58 is illustrated to show how the decreasing frequency of the distress waveform modulates the carrier. Waveform segment 60 in FIG. 2(i) represents the unmodulated carrier portion, waveform segment 62 represents the distress waveform, and waveform segment 64 represents the carrier signal modulated by the audio tone. In FIG. 2(i), waveform 62 illustrates how the decreasing frequency of the distress waveform modulates the carrier, and waveform 64 illustrates how the carrier is modulated by a single frequency audio tone. Other waveform combinations may, for example, indicate the type of distress incident, such as a fire, or the name of a marine vessel or the identifying numbers of an aircraft. However, to avoid confusion among search and rescue personnel, each particular item of information that may be utilized in this system needs to have a unique combination of parameters to identify it.

The number of unique combinations of the four parameters, and thus the number of different items of information, which may be broadcast by transmitter circuit 10 is practically unlimited. However, for the transmitter circuit 10 to properly operate with the receiver of this system, a portion of each distress transmission must be the uninterrupted or unmodulated carrier signal of RF oscillator 12, and the remaining portion of the distress transmission must comprise either the carrier signal modulated by the free running multivibrator signal 28, or the carrier signal modulated by the audio oscillator signal 22, or the carrier signal sequentially, and not simultaneously, modulated by both the free running multivibrator 28 and the audio oscillator 22. Transmitter 10 must so operate because the receiver, whose operation will be explained, automatically detects the uninterrupted or unmodulated carrier signal portion of the distress transmission and extracts information from the duration of the uninterrupted or unmodulated carrier signal and the modulated carrier signal. The receiver may also extract audio information from the distress transmission by the use of an AM detector.

Figure 3:
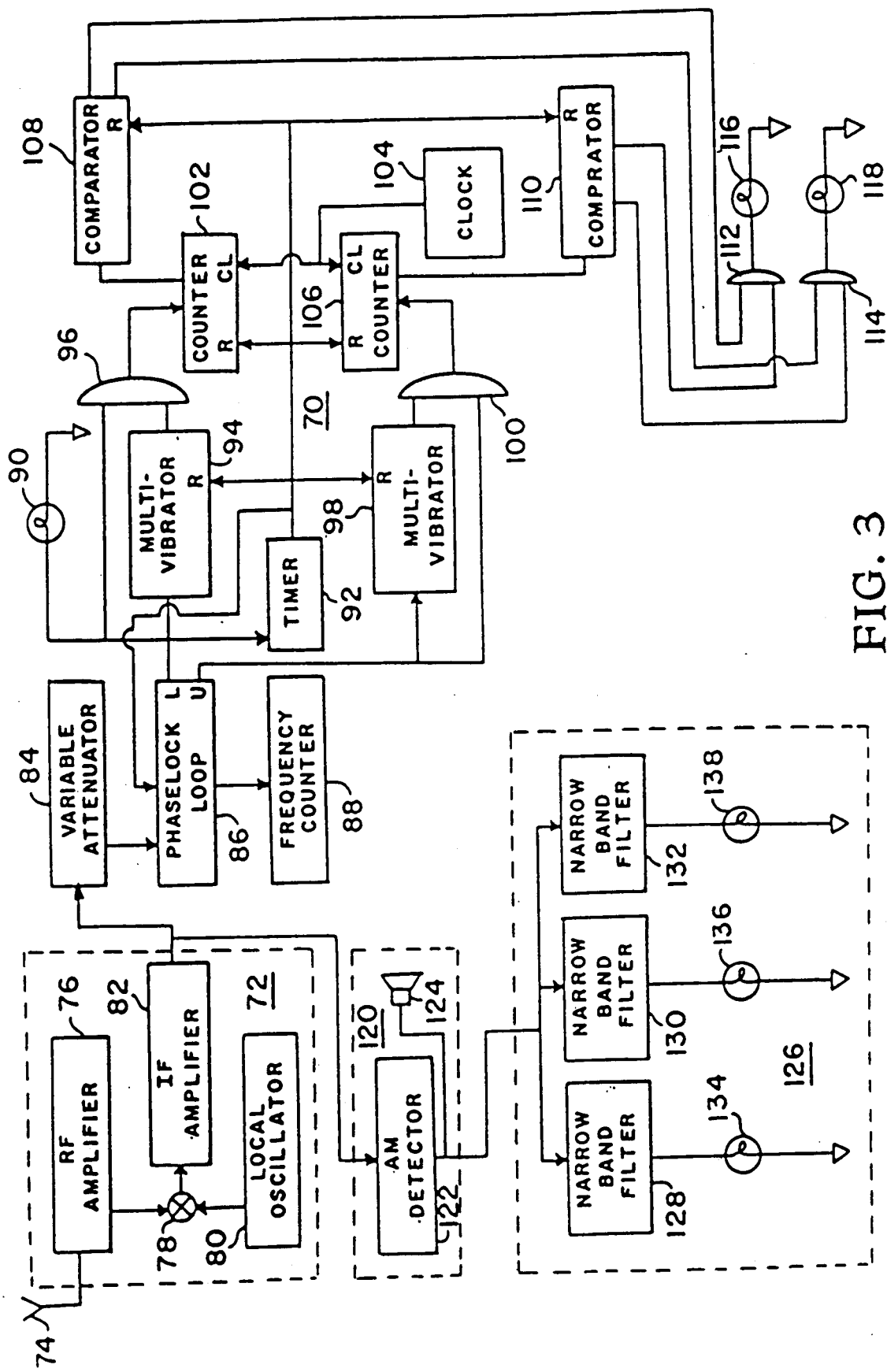
FIG. 3 is a block diagram of a receiver according to this invention used in conjunction with the ELT or EPIRB of FIG. 1.

Any conventional amplitude modulation receiver capable of receiving 121.5 MHz or 243 MHz signals can be used in the overall telecommunications system of this invention to receive the distress transmissions of the emergency locating transmitter or emergency position indicating radio beacon of this invention. The information contained in the distress transmissions can be extracted by the operator of the receiver by using conventional devices, such as a clock or a stopwatch, to measure the durations of each of the periods in each series of waveforms, and, in the case of a distress transmission containing information which demodulates to an audio tone, determining the frequency of the audio tone. These operations require the close attention of the receiver operator, who needs to accurately measure the parameters of each series of waveforms. This is a difficult task because the receiver operator is required to measure periods which may have very short durations, and because the intercepted distress transmissions may be very weak or obscured by noise. FIG. 3 shows a receiver 70, having a superheterodyne front end 72, which will relieve the operator thereof from manually measuring the parameters of each series of waveforms. Receiver 70 selectively detects distress transmissions from the transmitter 10, illustrated in FIG. 1, which utilize the unmodulated carrier signal as the first waveform transmitted, and once such a distress transmission is detected, it extracts and indicates the information contained in the distress transmission. Receiver 70 will also detect distress transmissions from transmitters which only transmit a carrier modulated by the distress waveform if the carrier signal is phase continuous. A signal is phase continuous if, upon interruption, there is no phase shift, i.e., its phase remains as if there has been no interruption at all.

Figure 4:
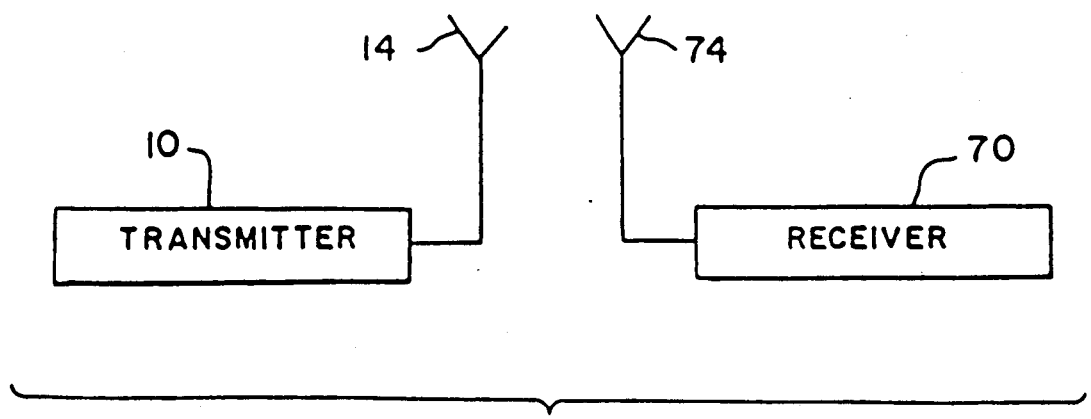
FIG. 4 diagrammatically illustrates the overall emergency locating transmitter and receiver system.

The operation of receiver 70 in conjunction with transmitter 10 in the overall telecommunications system of this invention, as diagrammatically shown in FIG. 4, follows.

An antenna 74 intercepts transmissions and feeds them to a radio frequency (RF) stage 76 which is turned to 121.5 MHz or 243 MHz, the frequencies reserved for distress transmissions. The output signal from RF stage 76 is applied to the intermediate frequency (IF) stage of the receiver, which comprises a mixer 78, a local oscillator 80, and one or more IF amplifiers 82. Local oscillator 80 is tuned simultaneously with the RF amplifier stage 76 so that the local oscillator frequency will always differ from that of the received distress transmission by a predetermined intermediate frequency value. The signals from the RF amplifier stage 76 and the local oscillator are heterodyned in mixer 78 to produce two new frequencies which correspond to the sum and the difference of the input frequencies to mixer 78. The difference frequency is fed to the IF amplifier 82, which efficiently provides the major portion of the amplification and selectivity required so that information can be extracted from the difference frequency.

The output of the IF amplifier 82 is fed through an optional variable attenuator 84, whose operation will hereinafter be explained, to a normally unlocked conventional phaselock loop 86 which locks when a signal threshold level is exceeded. Phaselock loop 86, contains, in a feedback loop, a phase detector, a loop filter, and a voltage-controlled oscillator containing a sweep circuit that generates a ramp-shaped voltage waveform which causes the voltage-controlled oscillator to repeatedly sweep through a predetermined frequency range. The sweep circuit may operate either in an automatic or a manual mode. In the automatic mode, it causes the voltage controlled oscillator to repeatedly sweep through the predetermined frequency range until the phaselock loop locks, at which point the sweep circuit is disabled until the phaselock loop unlocks. In the manual mode, the radio operator may manually adjust the instantaneous voltage level of the ramp-shaped voltage waveform. This, in turn, allows the radio operator to directly control the frequency of the voltage controlled oscillator. Manual control of the sweep circuit allows the radio operator to unlock the phase locked loop once it locks so that a search can be made for additional distress transmissions that vary slightly in frequency from the first detected distress transmission but which are in the bandwidth of the receiver and have a signal strength which exceeds the signal threshold level of the phase locked loop so that it may again lock. An optional frequency counter 88 measures the output frequency of the voltage controlled oscillator so that the receiver operator can note the frequency of each received distress transmission.

The phase locked loop 86 has two digital outputs, L and U, which respectively represent whether it is in a locked or unlocked condition. In the locked condition, the state of the L output is binary 1, and the state of the U output is binary 0, whereas in the unlocked condition, the state of the L output is binary 0, and the state of the U output is binary 1. The phaselock loop 86 locks when the uninterrupted or unmodulated carrier signal portion of the distress transmission is being received, or when a phase continuous signal is being received. This is because these signals exceed the threshold signal level of phase locked loop 86. The fact that these signals have a signal strength which exceeds the signal threshold level of phase locked loop 86 allows receiver 70 to detect transmissions which contain an unmodulated carrier portion, or transmissions which are phase continuous, that have a signal strength which may be too low to be detected by a radio operator utilizing a conventional radio receiver. When phase locked loop 86 locks, the state of the L output shifts from binary 0 to binary 1, and the state of the U output shifts from binary 1 to binary 0. Additionally, a lamp 90 lights when the state of the L output is binary 1 to visually indicate to the radio operator that the phase locked loop is locked. Phase locked loop 86 reverts back to its normal, unlocked condition when a modulated carrier signal is received which has a signal strength below the threshold signal of the phaselock loop.

As previously explained, phase locked loop 86 will lock when the uninterrupted or unmodulated carrier signal portion of the distress transmission is being received, or when a phase continuous signal is being received. This occurs as soon as phase locked loop 86 detects a signal which exceeds its predetermined signal threshold level. However, additional distress transmissions may exist, displaced in frequency from the first detected distress transmission, which are within the bandwidth of the receiver and which exceed the signal threshold level. These additional distress transmissions may prevent phase locked loop 86 from remaining unlocked during the period that the modulated portion of the first detected distress transmission is being received. This results in the duration of the modulated portion of the distress transmission being inaccurately measured. To allow receiver 70 to accurately measure the various durations of a distress transmission, the L output of phase locked loop 86 is fed to a conventional timer 92 which generates two pulses in response to the state of the L output initially shifting from binary 0 to binary 1. One pulse occurs at the instant the state of the L output shifts from binary 0 to binary 1, and the second pulse occurs a predetermined time after the first pulse. Both pulses are fed to the sweep circuit of phase locked loop 86, and to other portions of receiver 70, as will hereinafter be explained. The first pulse disables the sweep circuit so that phase locked loop 86 will not search for additional distress transmissions. During this period, however, phase locked loop 86 will, at the frequency of the detected distress transmission, be able to lock and unlock multiple times. The second pulse from timer 92 reenables the sweep circuit. If the sweep circuit is manually operated, the pulses from timer 92 will have no effect on its operation. The selection of the period of the two pulses from timer 92 will hereinafter be explained.

Variable attenuator 84 allows the radio operator to extract information from phase continuous distress transmissions comprising an unmodulated portion and a modulated portion, but in which the signal strength of the modulated portion exceeds the signal threshold level of phase locked loop 86. This situation may be detected by lamp 90 not extinguishing after a certain minimum time which corresponds to the longest expected duration of the unmodulated portion of a distress transmission. In this situation, the attenuation of the intermediate frequency signal fed to phase locked loop 86 from variable attenuator 84 is increased by the radio operator from initially no attenuation to a level at which the unmodulated carrier portion is above the threshold of the phase locked loop while the modulated portion is below loop threshold. This allows the phase locked loop to lock only when the unmodulated portion of the distress transmission is being received. This condition is indicated by lamp 90 being alternately illuminated and extinguished in a pattern having a constant repetition rate.

The L output of phase locked loop 86 is simultaneously fed to the input of a conventional bistable multivibrator 94, to one input of a two input AND gate 96, and to timer 92. The U output of phase locked loop 86 is simultaneously applied to the input of a bistable multivibrator 98 and to one input of a two input AND gate 100. Timer 92, in response to the state of the L output of phaselock loop 86 shifting from binary 0 to binary 1, immediately generates a reset pulse which is fed to the reset input R of bistable multivibrator 94 to reset its output to its initial or reset state of binary 1. The reset pulse from timer 92 is also fed to the reset input R of bistable multivibrator 98 to reset it to its initial or reset output state of binary 0. Bistable multivibrator 94 changes its output state from its initial or reset state of binary 1 only when the state of the L output of phase locked loop 86 shifts from binary 1 to binary 0. Bistable multivibrator 98 changes its output state from its initial or reset state of binary 0 only when the state of the U output shifts from binary 0 to binary 1. In the absence of a received distress transmission, the initial output state of AND gate 96 is binary 0 because the state of the L output of phase locked loop 86 is binary 0 and the initial output state of bistable multivibrator 94 is binary 1. The initial output state of AND gate 100, in the absence of a received distress transmission, is also binary 0 because the state of the U output of phase locked loop 86 is binary 1 and the initial output state of bistable multivibrator 98 is binary 0.

The output of AND gate 96 is fed to a conventional digital counter 102. Digital counter 102 starts counting when the output state of AND gate 96 shifts from binary 0 to binary 1, and it ceases to count when the output state of AND gate 96 shifts back to binary 0. A conventional clock 104 generates a pulse every 0.1 seconds which is applied to the clock input CL of digital counter 102 to cause the counter to count the length of time that the output state of AND gate 96 is binary 1 in 0.1 second increments. Digital counter 102 is reset to its initial zero output state by reset pulses from timer 92 fed to the reset input R. A reset pulse from timer 92 will also cause digital counter 102 to stop counting. The output of digital counter 102 represents the length of time that phase locked loop 86 is locked.

The output of the AND gate 100 is fed to another digital counter 106. Digital counter 106 starts counting when the output state of AND gate 100 shifts from binary 0 to binary 1, and it ceases to count when the output state of AND gate 100 shifts back to binary 0.

Digital counter 106 counts the length of time that the output state of AND gate 100 is binary 1 in 0.1 second increments, because the output pulse of clock 104 is also fed to the clock input CL of digital counter 106. Digital counter 106 is reset to its initial, zero output state by reset pulses from timer 92 applied to the reset input R. A reset pulse from timer 92 will also cause digital counter 106 to stop counting. The output of digital counter 106 represents the length of time that phase locked loop 86 is unlocked immediately after being locked.

A conventional digital comparator 108 receives the output of digital counter 102 once it stops counting, and another conventional digital comparator 110 receives the output of digital counter 106 after it stops counting. The outputs of the digital counters 102 and 106 respectively represent the durations of a received unmodulated carrier signal and of a modulated carrier signal received immediately after the reception of the unmodulated carrier signal. They also correspond to phase locked loop 86 being locked and unlocked immediately after being locked. Digital comparators 108 and 110 contain memory circuits in which the expected durations of phase locked loop 86 being locked and unlocked immediately after being locked are respectively stored. This is accomplished by expressing each expected duration as an item of information having a numerical value equal to the expected duration. Digital comparator 108 compares the duration of phase locked loop 86 being locked, which is measured by digital counter 102, to the expected durations of phase locked loop 86 being locked to detect a match. Similarly, digital comparator 110 compares the duration of phase locked loop 86 being unlocked immediately after being locked, which is measured by digital counter 106, to the expected durations of phase locked loop 86 being unlocked immediately after being locked to detect a match.

The number of outputs that each of the digital comparators 108 and 110 have corresponds to the number of values stored in each of the comparators. In the example given above, if the aircraft and the oil tanker are the only two potential sources of distress transmissions, then digital comparator 108 would have two items of information stored in it. Accordingly, digital comparator 108 would have only two outputs where one output corresponds to the aircraft and the other to the oil tanker. Similarly, digital comparator 110 would also have only two items of information stored in it, and therefore only two outputs where one output corresponds to the aircraft and the other to the oil tanker. Each of the comparators is illustrated as having two outputs. In practice, however, the maximum number of items of information stored in each comparator, and thus the number of outputs that it will have, is limited only by the memory capacity of the comparator. Furthermore, each output corresponds to a different item of stored information. Thus, if a comparator detects a match between the output of its associated digital counter and an item of information stored in its memory, the output state of the particular output corresponding to the matched item of information will be binary 1. In turn, the output state for each of the other outputs of the digital comparator will be binary 0. If no match is found, the output state of all of the outputs will remain at their initial, or reset state of binary 0. Each of the outputs of both digital comparators 108 and 110 is reset to its initial output state of binary 0 by a reset pulse from timer 92 fed to the reset input R of each digital comparator.

Different pairs of the durations of phase locked loop 86 being locked, and unlocked immediately after being locked, correspond to different items of information which may be transmitted in a distress transmission. From the example given above, an aircraft transmitting a signal would cause phase locked loop 86 to lock for two seconds and then unlock for eight seconds, while the oil tanker would cause it to lock for one second and thereafter then unlock for six seconds. If a distress transmission having one of these characteristics, or some other set of characteristics, matches values stored in the two comparators 108 and 110, the digital comparators will produce a pair of outputs which will correspond to the detected match. To extract the information contained in the distress transmission, each pair of digital comparator outputs which correspond to a particular detected match are fed to two input AND gates in which a pair of matches is indicated by a binary 1 output. Two such two input AND gates 112 and 114 are illustrated in FIG. 3. Each AND gate, in turn, has an associated indicating device, such as a lamp. Lamp 116 is connected to AND gate 112, and lamp 118 is connected to AND gate 114. One output from each of the digital comparators 108 and 110 are fed to AND gate 112, and the second output from each of the digital comparators are fed to AND gate 114. Lamp 116 will light only when AND gate 112 has two binary 1 inputs, and lamp 118 will light only when AND gate 114 has two binary 1 inputs. If lamp 116 lights, it may indicate, for example, that the aircraft is the source of the distress transmission. Alternatively, if lamp 118 lights, it may indicate that the marine vessel is the source of the distress transmission.

As previously described, the phase locked loop 86 is normally unlocked. If an uninterrupted or unmodulated carrier signal portion of a distress transmission, or a phase continuous signal, is received, the loop locks. When this occurs, the state of the L output shifts from binary 0 to binary 1, and the state of the U output shifts from binary 1 to binary 0. The phase locked loop 86 will cause the digital counter 102 to start counting because AND gate 96 now has two binary 1 inputs-one from bistable multivibrator 94 and one from the L output of phase locked loop 86. Digital counter 102 will count, in 0.1 second increments, the length of time that the output state of AND gate 94 is binary 1. The digital counter 102 will continue counting until either the output state of AND gate 96 shifts to binary 0 or a reset pulse is received from timer 92 at its reset input R. When digital counter 102 stops counting, its output is fed to digital comparator 108. If digital comparator 108 detects a match between the output of digital counter 102 and one of the values stored in it, it will so indicate by causing the state of the appropriate comparator output to shift from binary 0 to binary 1. This output will be maintained until a reset pulse from timer 92 is received at the R input of the digital comparator 108.

In turn, when phase locked loop 86 locks, the U output state will shift from binary 1 to binary 0, but the output state of bistable multivibrator 98 will not shift from its initial output state of binary 0 because its output state only shifts when the U output state shifts from binary 0 to binary 1. Accordingly, the output state of AND gate 100 will remain at its initial output state of binary 0, and digital counter 106 will not start to count.

When phase locked loop 86 unlocks after being locked, digital counter 102 will stop counting due to the output state of AND gate 96 shifting to binary 0 from binary 1, the output state of bistable multivibrator 94 will shift to binary 0 from binary 1, and the output state of multivibrator 98 will shift from binary 0 to binary 1. Digital counter 106 will now start counting because the two inputs of AND gate 100 are now binary 1. Digital counter 106 will continue to count until the phase locked loop 86 locks again, which will cause the output of bistable multivibrator 98 to reset the binary 0 whereupon the output of AND gate 100 shifts to binary 0, or until a reset pulse from timer 92 is received at the reset input R of digital counter 106. When digital counter 106 stops counting, its output is fed to digital comparator 110, which determines if a match exists between the output of digital counter 106 and the values stored in the memory of digital comparator 110. If a match is detected, the digital comparator 110 will so indicate by causing the appropriate comparator output to shift its state from binary 0 to binary 1. This output will be maintained until a reset pulse from timer 92 is received at the R input of the digital comparator 110.

If phase locked loop 86 locks again after being unlocked, but before timer 92 generates its second reset pulse, neither digital counter will start to count again. Digital counter 102 will not start again because the output state of bistable multivibrator 94 shifted to binary 0 from binary 1 when phase locked loop 86 unlocked. Digital counter 106 will not start again because the state of the U output is binary 0.

The period of timer 92 is set to be longer than the longest expected combined period of the uninterrupted or unmodulated carrier portion and the modulated portion of a distress transmission. This allows the complete duration of each portion of a distress waveform to be measured before timer 92 generates its second reset pulse.

The receiver 70 may also include a circuit 120 for extracting the audio information present in the modulated portion of a distress transmission. This circuit comprises an AM detector 122, and a speaker 124. AM detector 122, which receives its input from IF amplifier 82, recovers the audio information present in the modulated portion of a distress transmission by rectifying the signal from IF amplifier 82 to produce pulsating currents whose envelope corresponds to the audio information present in a distress transmission. The output of AM detector 122 is fed to a speaker 124 so that the receiver operator can aurally monitor the modulated portion of a distress transmission. In place of, or in addition to speaker 124, the receiver 70 may include a circuit 126 which detects and indicates the presence of an audio tone or signal in the modulated portion of a distress transmission. Circuit 126 includes a series of diversely tuned narrow band audio filters connected to the output of AM detector 122, and an individual indicating device connected to each filter. The purpose of the narrow band audio filters is to detect the presence of a pure audio tone in the modulated portion of a distress transmission. The number of narrow band audio filters required by the receiver is determined by, and is equal to, the maximum number of audio tones expected to be utilized. The passband of each narrow band audio filter in the series is set so as to be centered on the frequency of one of the audio tones. Three narrow band audio filters 128, 130, and 132 are illustrated. The passband of narrow band audio filter 128 may, for example, be centered on 100 Hz, the passband of narrow band audio filter 130 may be centered on 200 Hz, and the passband of narrow band audio filter 132 may be centered on 300 Hz. Lamps 134, 136 and 138 are individually connected to respective ones of the narrow band audio filters to indicate whether an audio tone of a frequency within the passband of a filter has passed therethrough.

Receiver 70 may be used in conjunction with a satellite ground receiving station which is capable of receiving distress transmissions relayed to it by a satellite. The satellite relays the distress transmissions to the satellite ground receiving station through the use of a frequency translation process so that no information is lost. The receiver 70 may be utilized with the satellite ground station receiver by first translating the intermediate frequency signal generated by the satellite ground station receiver to the intermediate frequency of receiver 70 and by then feeding the translated signal to IF amplifier 82. The benefit of using the receiver illustrated in FIG. 3 in conjunction with a satellite ground station receiver is that the detection of the source of distress transmission can occur in only 15–30 seconds, whereas the existing satellite aided detection/location scheme identifies the location of the source of a distress transmission in approximately 4 minutes. Thus, less information is required when the receiver illustrated in FIG. 3 is utilized.

Obviously, numerous modifications and variations of the present invention are possible in light of this disclosure. It is therefore to be understood that with in the scope of the appended claims the invention may be practiced other than as specifically described herein.

What is claimed is:

1. A distress transmitter comprising:
   means for generating a radio frequency carrier;
   means for generating a first audio signal to indicate a distress condition;
   means for generating a second audio signal, which differs from said first audio signal,
   means for modulating said radio frequency carrier with said first and second audio signals as well as for providing a period during which said radio frequency carrier is unmodulated; and
   means for sequentially transmitting a periodic signal containing said first audio signal modulated carrier, said second audio signal modulated carrier and said unmodulated carrier, each with predetermined durations.

2. The distress transmitter of claim 1 wherein said modulation with said first and second audio signals is sequential.

3. The distress transmitter of claim 1 wherein the repetition rate of said transmitted signal is variable.

4. The distress transmitter of claim 1 wherein the duration of each of the said first audio signal modulated carrier, second audio signal modulated carrier and said unmodulated carrier, is variable.

5. The distress transmitter of claim 1 wherein the sequence of transmission of said first audio signal modulated carrier, second audio signal modulated carrier and said unmodulated carrier, is variable.

6. The distress transmitter of claim 1 wherein said frequency of said second audio signal is variable.

7. The distress transmitter of claim 1 wherein said second audio signal is employed to identify said transmitter.

8. A transmitter comprising:
   means for generating a radio frequency carrier;

means for generating an audio signal to identify said transmitter among a plurality of transmitters operating on the same frequency;

means for amplitude modulating said radio frequency carrier with said audio signal as well as for providing a period during which said radio frequency carrier is unmodulated; and means for sequentially transmitting a periodic signal containing said audio signal modulated carrier and unmodulated carrier, each with predetermined durations.

9. The transmitter of claim 8 wherein the repetition rate of said transmitted signal is variable.

10. The transmitter of claim 8 wherein the duration of each of said audio signal modulated carrier and said unmodulated carrier, is variable.

* * * * *